May 21, 1935.  A. R. SCHOENKY  2,001,750
SHOE CONVEYING SYSTEM
Filed Dec. 24, 1929   5 Sheets-Sheet 1

INVENTOR-

May 21, 1935.  A. R. SCHOENKY  2,001,750
SHOE CONVEYING SYSTEM
Filed Dec. 24, 1929   5 Sheets—Sheet 2

INVENTOR-
August R. Schoenky

May 21, 1935. A. R. SCHOENKY 2,001,750
SHOE CONVEYING SYSTEM
Filed Dec. 24, 1929 5 Sheets-Sheet 3

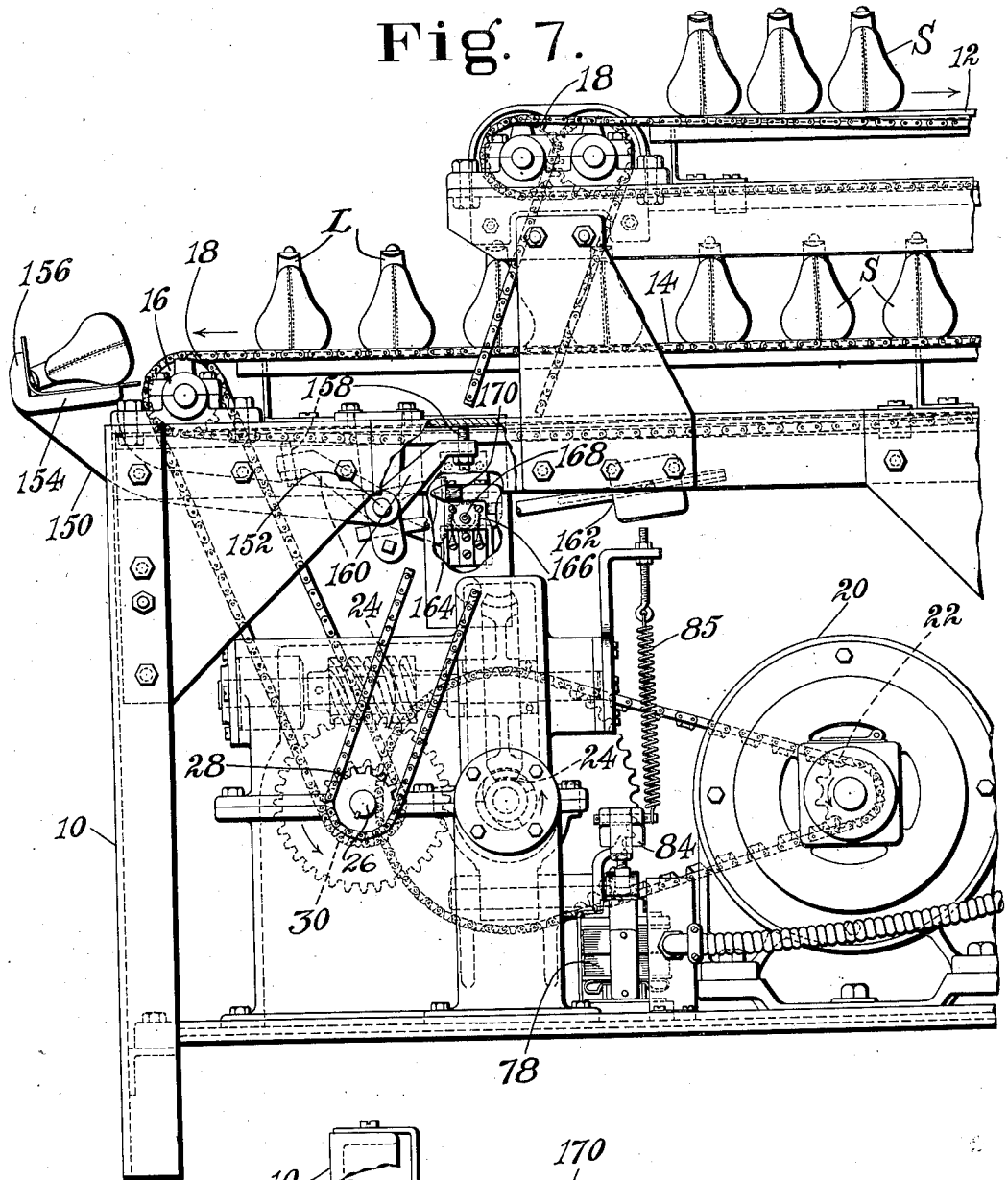

Patented May 21, 1935

2,001,750

UNITED STATES PATENT OFFICE 2,001,750

SHOE-CONVEYING SYSTEM

August R. Schoenky, Beverly, Mass., assignor to United Shoe Machinery Corporation, Paterson, N. J., a corporation of New Jersey Application December 24, 1929, Serial No. 416,242

23 Claims. (Cl. 198—20)

This invention relates to systems for advancing shoes or shoe-portions from one operating position to another, it being especially concerned with the control of the delivery from shoe-conveyers. During the manufacture of shoes, the transfer of their constituent parts from one operator to another by such conveying means as endless power-driven belts gives increased efficiency, and during this advance it may be desired to subject the work to the action of a conditioning agent to moisten, dry or cool it. During this treatment, it may be convenient to shift the work, as at the delivery end of a conveyer. An example of such transfer is found in conveying systems having an upper belt and a lower belt to which the upper delivers, there being thus obtained an almost double length of travel without substantial increase in the floor-space occupied. Since upper leather, and especially the patent or enameled sorts, are readily injured when warm or moist, shoes are customarily placed on the conveyers bottom down, they being also more readily removed by the receiving operator when thus uniformly arranged. In the change of position involved in delivery, they may contact with one another or fall sidewise and bear on the receiving surface sufficiently to mar the finish of the leather. My invention has as an object the prevention of this difficulty and the advance of the work by the conveyer or conveyers without interference or clogging at the delivery or transfer-points.

In accomplishing this object, as a feature of the invention I provide means for maintaining the transferred shoes, which, at this time, may be in the form of upper-portions carried by lasts, in the same generally upright positions throughout their travel, there being means which contacts with them during their delivery to bring this about. For this purpose, a plurality of positioning means may be employed, such plural means being most necessary when the shoes fall by gravity from an upper to a lower conveyer. In the illustrated embodiment of my invention, three of these positioning means are disclosed. One consists of flexible members, preferably in sections, yieldably supported and adjustable with respect to the conveyer. These members cooperate with the last-cones, acting to hold the shoes against tilting forward as they pass over the end of the conveyer. A second positioning means is furnished by a deflector opposite the delivery end of the conveyer and arranged to contact with the forward side of the shoes to direct them. Still a third positioning means is movable in such a location as a throat through which the conveyer delivers. It is displaced by the falling work and returned to its normal position, at which time it exercises its positioning effect. As a result of thus governing the delivery of the shoes, contact which would be injurious to them is prevented.

In such relations as attend the passage of the work from an upper to a lower conveyer, certain of the previously indicated positioning means, lying in its path along the throat or way through which they descend, may cause clogging. As a further feature of my invention, I guard against the forcing of succeeding shoes by the conveyer against the thus-accumulated shoes by furnishing driving means for a conveyer, with novel means under the influence of the shoes in their passage from said conveyer for controlling the driving means. Under this control, power may be disconnected from the conveyer or conveyers as soon as an obstruction occurs, thus preventing damage to the work. I have shown this control as exercised both through the previously mentioned deflecting means and through the displaceable means, though one or both may be utilized, as is desirable, or still other means employed. In any event, there is preferably a movable member between which and the controlling means for the driving mechanism are actuating connections.

In the accompanying drawings.

Figure 1:
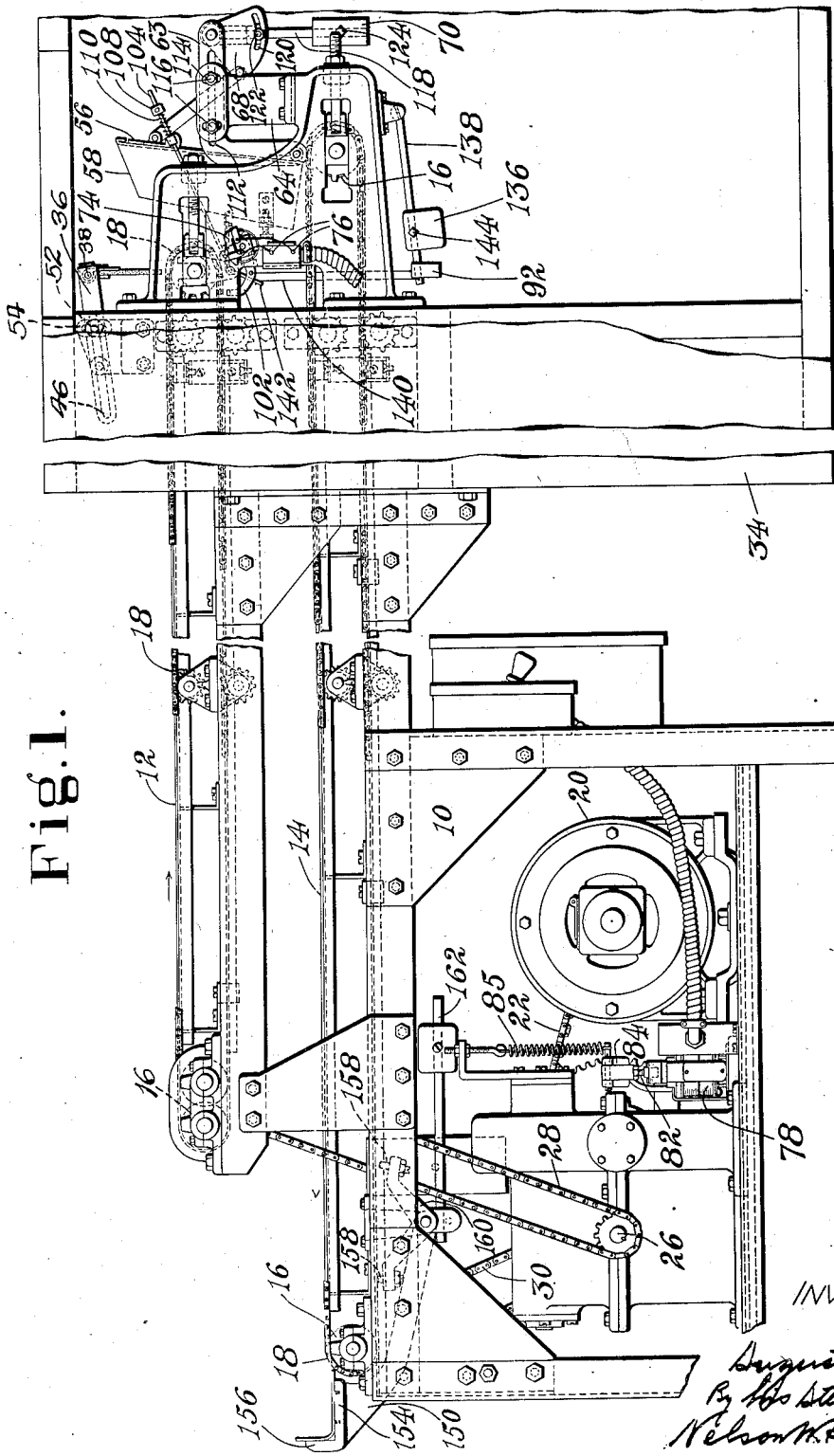
Fig. 1 shows in broken side elevation one of the many forms which my invention may assume.
Figure 3:
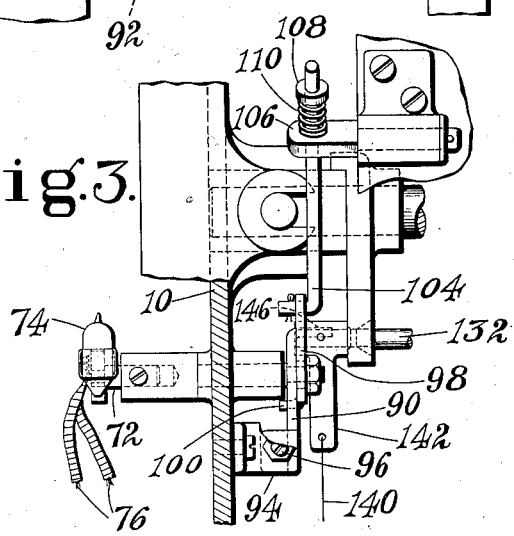
Figure 5:
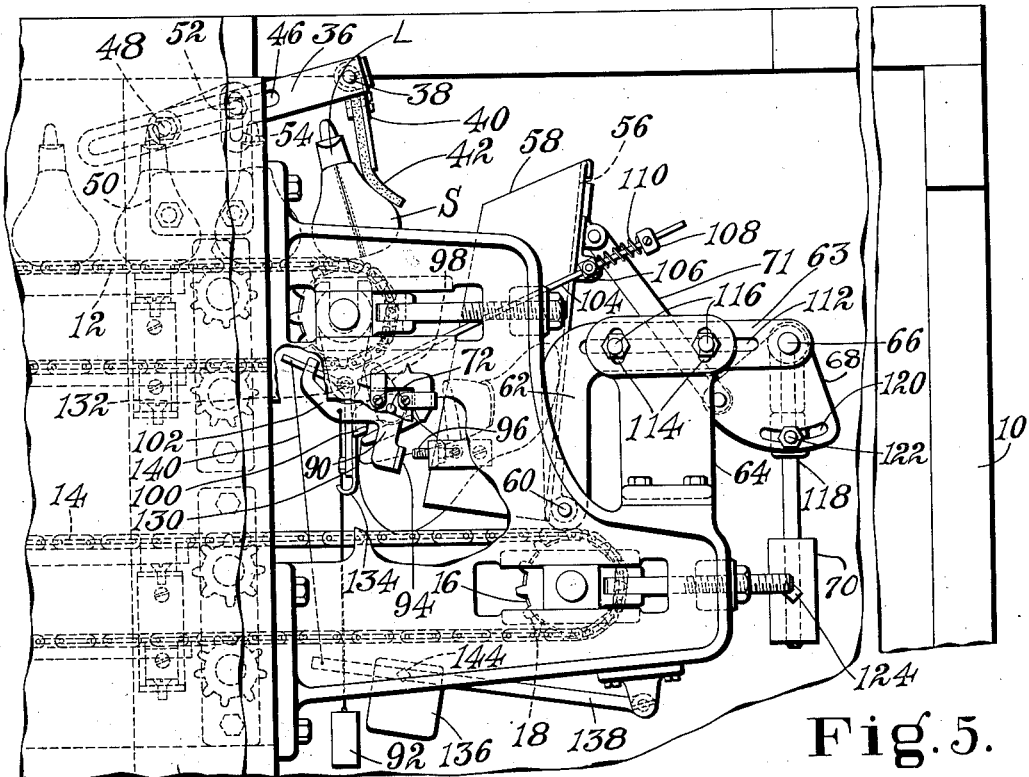
Figure 4:
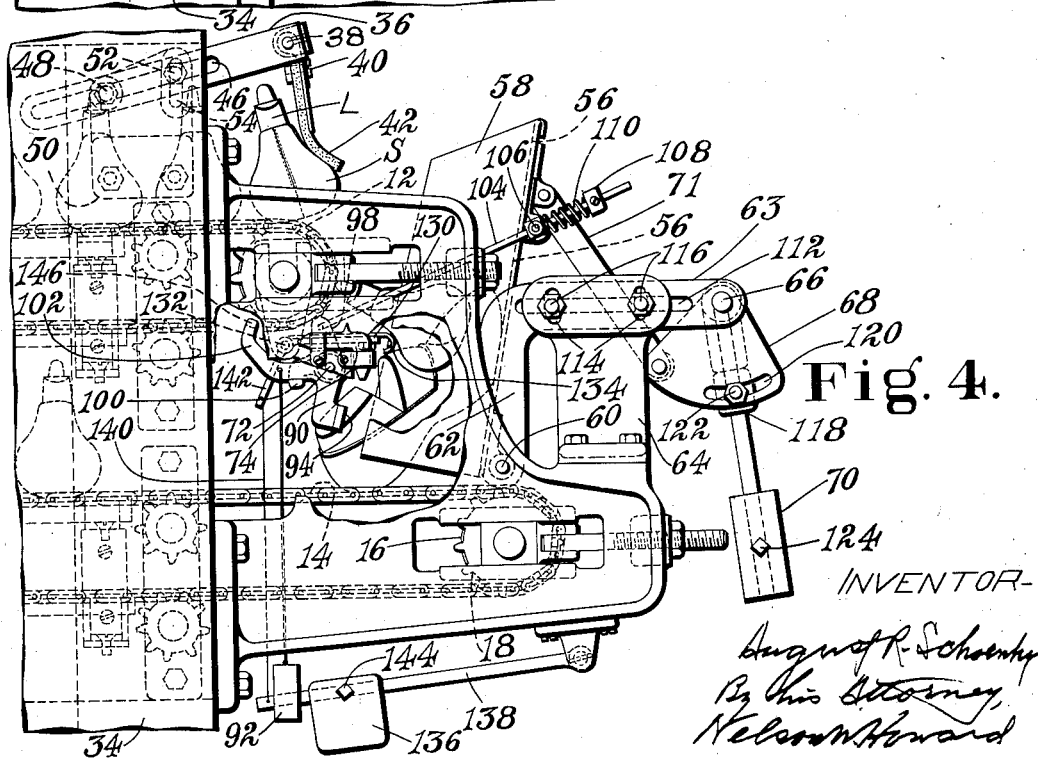
Figure 6:
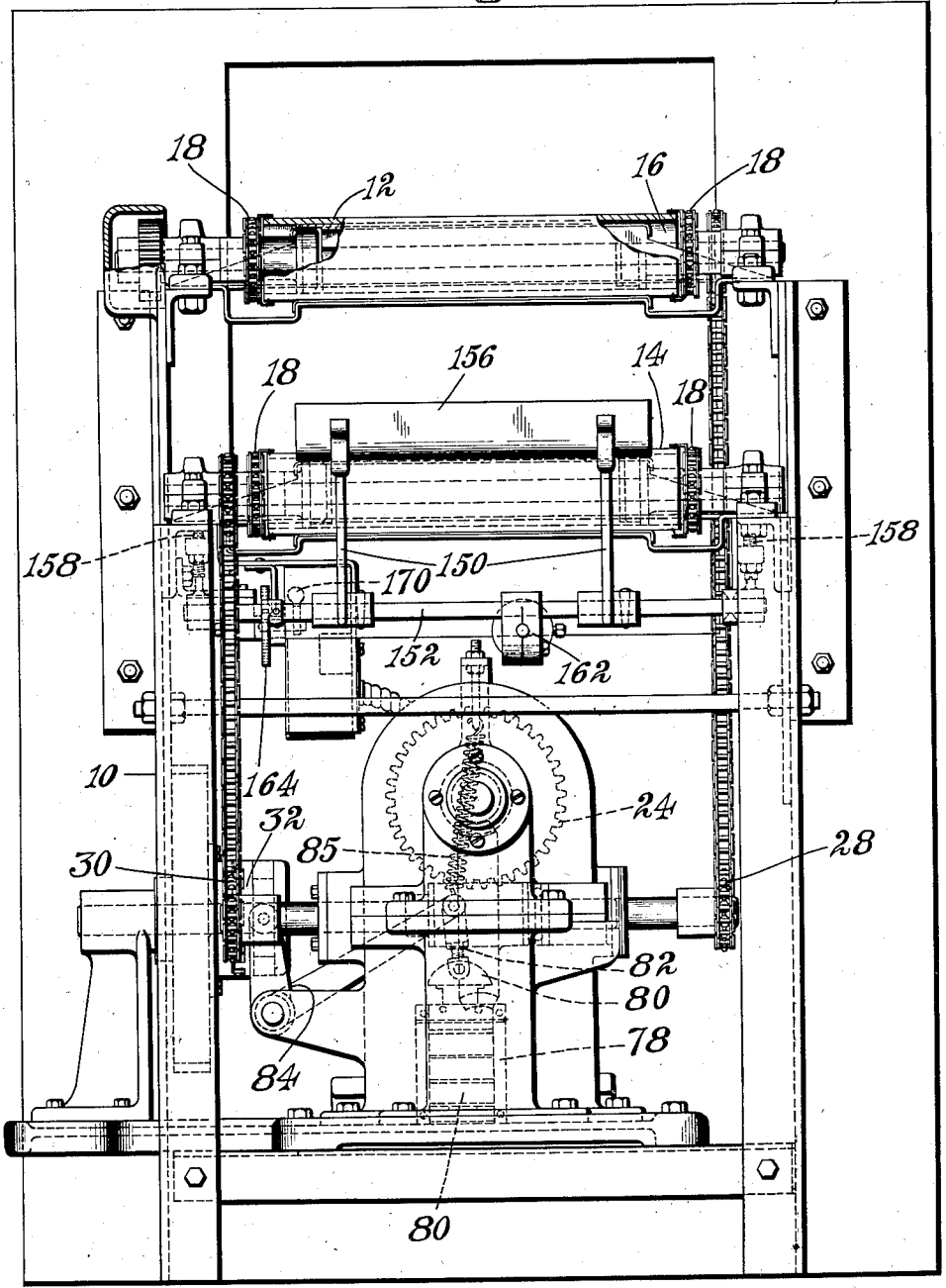

Fig. 3, an enlarged detail in elevation of the controlling mechanism at this end of the conveying system;

Figs. 4 and 5, enlarged broken side elevations of the transfer end of the machine, illustrating different relations in which the work may cause clogging;

Fig. 6 is an end elevation looking from the left in Fig. 1;

Fig. 7, a broken side elevation of this portion of the system; and

Fig. 8, an enlarged broken detail in elevation of the controlling mechanism associated with this portion of the system.

Upon a frame 10 are supported conveying means, shown as an upper endless belt 12 and a lower endless belt 14. These belts may be of such length as to give the desired travel, the distance being substantially doubled by causing the work upon the upper conveyer, upon which said work is deposited at one extremity, to be transferred at the delivery end to a lower conveyer, which returns it to near the receiving or loading point. The particular conveying organization employed is not important in the present connection. It is sufficient to say that the conveyers run over rolls 16 journaled in the frame, the rolls of each conveyer being turned together by sprocket-gearing 18. At the bottom of the frame appears an electric motor 20. This is joined by sprocket-gearing 22 and double reduction-gearing 24 to a shaft 26, which, in turn, is connected by sprocket-gearing 28 and 30 to the conveyers 12 and 14, respectively, to cause the travel of these at the chosen speed. Included between the motor and reduction-gearing 24 is a clutch 32 (Fig. 6) to permit the driving force to be thrown on or off the system. The manner in which the clutch is controlled will be developed later. Except at the feed end of the conveyer 12 and the delivery end of the conveyer 14, they may be enclosed in a casing 34 furnishing a chamber for the retention of moistened, heated or cooled air, by which the condition of the shoes or shoe-parts may be changed during their travel.

Figure 2:
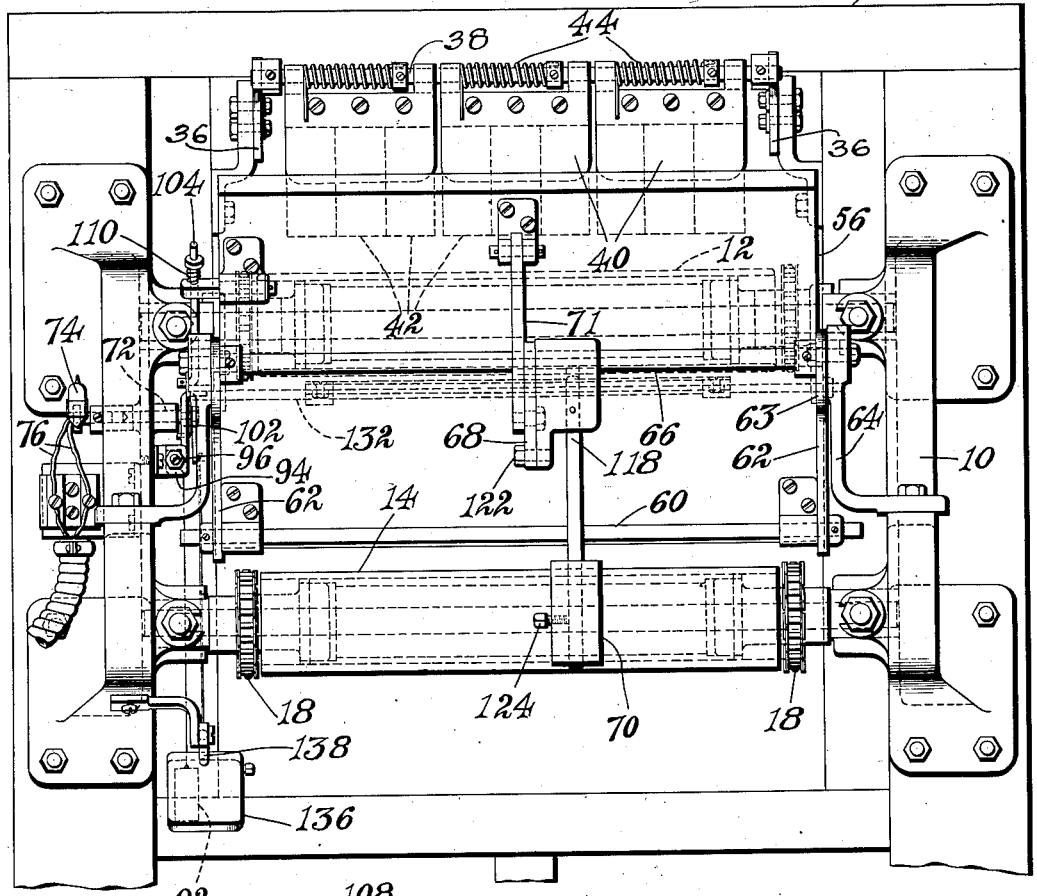
Fig. 2 is an end elevation of the upper portion of the organization looking from the right in Fig. 1.

As is illustrated in Figs. 4, 5 and 7 of the drawings, shoe-uppers S upon lasts L are placed by an operator side by side on the receiving end of the conveyer 12 outside the casing 34, the longitudinal axes of said shoes being transverse to the direction of travel of the conveyer. Normally, this conveyer and its companion advance continuously to subject the work in the casing 34 to the influence of the conditioning agent, and finally to bring them to another operator, by whom they are to be utilized. The receiving end of the lower conveyer extends somewhat beyond the delivery-end of the upper, and when each shoe reaches the latter point, it passes over and descends by gravity to the lower conveyer. When ungoverned in this transfer, the positions assumed are uncertain. The shoes may lie upon either side, or may overlap and bear on one another. As a result of their treatment in the casing, especially when heat has been there applied, the finish of the leather is likely to become marred, and the disorderly arrangement makes it difficult for the receiving operator to handle them most efficiently. This invention leads to the maintenance of their substantially upright relation throughout their transfer, they being delivered side by side bottom down upon the lower conveyer, without contacting with one another. This result is obtained in the following manner:

As each shoe reaches the delivery end of the upper conveyer 12, the curvature of the roll 16 at this point inclines said shoe forward, the cone of the last being in advance of the body. Unrestrained, the shoe would fall on its forward side upon the conveyer 14. I counteract this effect by contact means, which retains the upper portion of the shoe against tilting. Secured to the frame at each side of and above the conveyer 12 is an arm 36, these arms having mounted at their forward extremities a spindle 38, which extends across the conveyer 12. Arranged to turn independently of one another upon the spindle is a series of holders 40 (Fig. 2), in each of which is clamped a sheet 42, either whole or divided vertically, of some such flexible material as rubber, the edge of which sheet depends into proximity with the work-supporting surface of the conveyer. Each holder and sheet are permitted to yield together about the spindle, independently of the associated elements, against the force of a spring 44, which joins the particular holder to the spindle. Just as each shoe reaches the end of the belt 12, the lower extremities of the sheets come in contact with it, tending to retard its movement. As the travel of the conveyer forces the shoe against the sheets, they yield, both by virtue of their flexibility and by the rotation of the holders against the tension of the springs 44. This arrangement permits the displacement of these positioning elements to vary independently, so that they may conform to the curvature of the shoe both longitudinally of it and vertically. Consequently, their action is obtained without material alteration of the relation of the longitudinal axis of the shoe to the conveyer. As the shoe leaves the conveyer, the engagement of the sheets with the cone of the last maintains this against forward displacement, so that it falls in approximately the same relation it occupied on the conveyer. To cause these contact members 42 to act to the best advantage upon the work, especially when the form of the last changes, the carrying arms 36 are made adjustable in their relation to the conveying belt. In each arm is a longitudinal slot 46 connected by a bolt 48 to a mounting member 50 attached to the frame and by a bolt 52 through a vertical slot 54 in the mounting member. As a result of this, the arms 36, and with them the sheets 42, may be adjusted longitudinally of the conveyer by virtue of the shifting of the slots in the arms along the bolts 48 and 52, and the sheets raised and lowered or varied as to their angular relation by turning the arms about the bolts 48, the bolts 52 traveling along the slots 54.

The work-pieces leave the conveyer 12 under some momentum, which would tend to throw them over the receiving end of the conveyer 14 and also to tip the upper portions forward, the cones of the lasts thus being turned down so the shoes would rest on their sides. This is guarded against by a deflecting plate 56 extending across the end of the conveyer 12 and being inclined downwardly and inwardly over the conveyer 14. The shoes contact with this deflector in their fall, slide along and are guided by it, the cones of the lasts being prevented from tilting, and the shoes reaching the lower conveyer bottom down. To avoid lateral displacement of the work from the deflecting plate, it is preferably provided with sides 58 extending from it parallel to each other and forming a chute through which the shoes descend.

Sometimes the shoes, in falling, depart from their symmetrical transverse relation, and, catching between the plate 56 and some associated element, clog and are not advanced by the conveyer 14. This is illustrated in Fig. 4. The plate is therefore yieldably mounted and connected to control the driving mechanism when this abnormal condition occurs. The lower edge of the plate is pivoted at 60 upon vertical portions of brackets 62 attached to small standards 64 rising from the frame. Journaled at the outer ends of horizontal portions 63 of the brackets is a shaft 66, near the center of which is fixed a sector 68 caused to occupy a predetermined normal position by a weight 70 depending from it. A link 71 joins the plate to the sector. Journaled at one side of the frame is a short shaft 72 (Fig. 3), upon the outer extremity of which is mounted an electric switch 74, shown as of the well-known mercury type.

Conductors 76 connect this, together with a source of electrical energy, to the winding of a solenoid 78 (Figs 1 and 6) carried on the frame near the gearing 24. The vertically movable core 80 of this solenoid is articulated through a link 82 to a bell-crank lever 84 fulcrumed at the bottom of the frame and having a vertical arm arranged to actuate the clutch 32, the normal engagement of which is maintained by a spring 85 extending between the lever 84 and the frame. Fast to the shaft 72, and thus being movably mounted with the switch, is a bell-crank lever 90 (Figs. 4 and 5) held normally by a weight 92, with a projection 94 from its depending arm against an adjustable stop-screw 96 carried by the frame. With the elements thus related, the contacts of the switch 74 are open, the solenoid 78 deenergized and the sections of the clutch 32 are engaged, so power is transmitted from the motor to the conveyers to produce their travel. Mounted to turn upon the shaft 72 is a bell-crank lever 98, from which a projection 100 extends beneath a horizontal arm 102 of the lever 90. A vertical arm of the lever 98 has articulated to it a link 104 movable through an opening in a lug 106 at one side of the plate 58. Between the lug and a collar 108 fixed to the link is a compression-spring 110. The pressure exerted by a single shoe passing along the deflecting plate 56 is not sufficient to turn this about the spindle 60. But if a shoe catches in its descent over the plate and prevents the advance of the succeeding shoe, the combined weight swings the upper portion of the plate outwardly, displacing the weight 70. This movement of the plate is communicated through the link 104 to the lever 98, which, by its projection 100, turns the switch-lever 90, tilting the switch 74 so that its contacts are closed. Current thereupon flows through the solenoid 78, which attracts its plunger and, by movement of the lever 84, separates the clutch 32 to stop the travel of the conveyers. The operator, observing this, is warned of the trouble, removes the retained shoes and starts the conveying system in action. The character of the spring 110 is such that it transmits normally the movement of the plate 56 to the lever 98, and, when the switch has reached its extreme actuated position, will permit further movement of the plate without effect upon the switch-organization. To give the most perfect deflecting action upon the falling shoes, to insure their maintenance in the desired position, the plate 56 is adjustable, longitudinally, vertically and angularly with relation to the conveyer 14. For this purpose, the brackets 62 are each provided with a horizontal slot 112, and in the standards 64 are vertical slots 114. Through each slot 112 and the associated slot 114 extend bolts 116. By this means, the bracket may be shifted both horizontally and vertically and clamped in position. The weight 70 is carried by a rod 118 arranged to turn about the spindle 66. In the sector 68 is an arcuate slot 120, through which passes a screw 122 fixed to the rod, a nut on the screw clamping the sector and rod together. By alteration of the point at which the screw is fixed in the slot, the relation of the rod to the sector is changed, and, since the weight always hangs normally in a vertical position, this correspondingly varies the angle of the plate 56.

When the shoes are sliding down the deflector 56, their unrestrained momentum would have the effect of tipping them forward, so they might strike the conveyer 14 upon their sides. This tendency I counteract by a contact member which lies in the path of the shoes, being displaced by them, and which, in returning to its normal position, rights them. Projecting in a substantially horizontal direction from beneath the conveyer 12, toward the plate 56 across the throat formed between said plate and the conveyer is a plate 130 secured to a spindle 132 turning horizontally in the frame. A rounded portion 134 at the outer edge of this plate prevents its engagement with the material of the shoes from marring them. The plate 130 is held normally, as appears in Fig. 4, by a weight 136 carried by a lever 138 fulcrumed beneath the conveyer 14, the lever being connected by means 140 to an arm 142 fast upon the spindle 132 and, with the plate 130, furnishing a lever. The weight 136 may be moved along the lever and fixed at different points by a set-screw 144, this allowing the force exerted by the weight upon the plate 130 to be altered. Sliding along the plate 56, the shoes contact with the plate 130, displacing this downwardly about its axis in the spindle 132. At first this plate 130 offers partial support to each shoe, holding it against being thrown forward by its momentum. Finally, in the downward travel of the shoe, the plate is freed sufficiently to be swung back to its normal position by the weight 136. In this movement, its rounded end wipes up along the shoe and the cone of the last and tips these back to a vertical position, finally leaving the shoe and its last and being restored to the horizontal. In this desired upright relation the shoe is left on the conveyer 14.

Under certain conditions, especially when a shoe chances to become turned lengthwise in its fall, it may catch in the position illustrated in Fig. 5, retaining the plate 130 depressed and resisting the advance of the succeeding shoes. Clogging at this point is guarded against by utilizing this excessive movement of the plate to control the conveyer driving mechanism. The plate-arm 142, to which the weight 136 is attached, is shown as extending beneath an angular end 146 of the bell-crank lever 90 mounted with the switch 74. In the normal action of the restraining plate 130, the arm does not reach the lever-end, but, under the conditions just assumed, it contacts with this and moves the lever sufficiently to close the contacts of the switch. Just as in connection with the yield of the deflector 56, the switch closes the circuit of the solenoid 78 and disconnects the clutch 32 to stop the advance of the conveyers.

Work having reached the lower conveyer 14 travels upon it in the same relative position as it was placed on the upper conveyer 12, receiving the remainder of its treatment in the chamber 34. The workman at the delivery end of the conveyer 14 will remove the shoes one by one for his operation upon them. Were he delayed, so as not to be ready to receive an arriving shoe, it would, unless means were provided to prevent this, fall on a receiving surface and perhaps be defaced. This I avoid by control of the driving mechanism for the conveyers exercised by each shoe left upon the conveyer by the receiving operator. Mounted upon arms 150 secured to a shaft 152 journaled horizontally in the frame is a receiving shelf 154, this normally (Fig. 1) lying in alinement with or just below the upper run of the conveyer 14. At the outer side of the shelf is a guard-wall 156 preventing the received shoes from overrunning the shelf. Stop-screws 158, threaded through the ends of arms 160 fixed to the shaft 152, contact with the frame to limit movement of the shelf both toward and from its alinement with the conveyer. The shelf is normally held raised by a weighted arm 162 extending inwardly from the shaft 152. Also secured to the shaft is a gear-segment 164 meshing with a pinion 166 fast upon a short shaft 168 rotatable in the frame (Fig. 8). This shaft carries a mercury-switch 170 or the like, the contacts of which are in parallel with those of the switch 74. If a shoe is left upon the conveyer 14 by the receiving operator until it is carried over upon the shelf 154, this is depressed (Fig. 7) and, through its connections to the switch 170, tips this until its contacts are closed. In the same manner as already described in connection with the switch 74, the advance of the conveyers is stopped. The actuating shoe remains on the shelf until removed by the operator, whereupon the weight 162 produces the restoration of the shelf to normal, the opening of the switch-contacts and the resumption of travel of the conveyers.

To trace the course of a shoe through the conveying system, the operator at the receiving end of the conveyer 12 places the shoe upon this bottom down, it then being carried through the casing 34 to receive therein the chosen treatment. Arrived at the delivery end of this upper conveyer 12, the shoe comes under the influence of three distinct positioning means. First, the sheets 42, adjusting themselves to its contour, tip the shoe back as it passes over the end of the conveyer 12, so that it falls with little forward displacement. Then the plate 56 deflects and directs it down, still with no material departure from the vertical, striking the plate 130 while it is still acted upon by the deflecting plate. This plate 130 yields before the falling shoe, and in its return to the normal horizontal relation presses against and holds said shoe erect. Uncorrected clogging of the throat through which the shoe falls from the conveyer 12 is prevented, first by the yield of the plate 56 and second by movement of the plate 130 farther than usual. The displacement of these plates in either case causes the closing of the contacts of the mercury-switch 74 common to both, with the resulting disconnection of the clutch 32 and the stopping of the conveyers. When the difficulty is righted by the operator, the clutch is reconnected by the spring 85 and the travel of the conveyers is resumed. Passing along upon the conveyer 14, the shoe is either removed from it by the receiving operator, or, if he cannot do this, it is delivered to the shelf 154, actuating the mercury-switch 170, thereby separating the driving clutch to stop the conveyers. They rest until the shoe on the shelf is lifted therefrom, when the conveyer system again starts in operation.

Having described the invention, what I claim as new and desire to secure by Letters Patent of the United States is:

1. The combination with an endless conveyer upon which shoes on lasts are placed bottom down, of a member situated at the delivery end of the conveyer and arranged for co-operation with the cone of each last to hold it against tilting forward as it passes over the end of the conveyer.

2. The combination with a conveyer for shoes, of flexible shoe-positioning means formed in independently movable sections arranged side by side in a series for contact with the shoes on the conveyer, and a mounting for each section arranged to permit it to yield as a whole and independently of the associated sections.

3. The combination with a conveyer for shoes, of a flexible shoe-positioning sheet arranged transversely at the end of the conveyer for contact with the shoes thereon, a support for the member normally fixed during the positioning action, and means arranged to secure the support against movement in different positions with respect to the conveyer.

4. The combination with an endless conveyer upon which shoes on lasts are placed bottom down, of a member situated at the delivery end of the conveyer and arranged for engagement with the cone of each last while still in contact with the conveyer to hold said last against tilting forward as it passes over the end of the conveyer, and means arranged to vary the angular relation of the member to the conveyer.

5. The combination with an endless conveyer upon which shoes on lasts are placed bottom down, the end of the conveyer being free for the descent of the lasted shoes therefrom, of a member situated at the delivery end of the conveyer and arranged for co-operation with the cone of each last to hold it against tilting forward as it descends over the end of the conveyer, and means arranged to vary the position of the member longitudinally of the conveyer.

6. The combination with an endless conveyer for shoes, of a spindle situated above the conveyer, a sheet of flexible material mounted to oscillate about the spindle, and a spring connecting the spindle and sheet.

7. The combination with an endless conveyer for shoes, of a spindle extending across the conveyer, a series of holders arranged to turn upon the spindle, a sheet of flexible material secured to each holder and depending in the path of the shoes, and a spring joining each holder to the spindle.

8. The combination with a frame, of a belt-conveyer arranged to travel therein, opposite arms variable in position upon the frame, a spindle extending between the arms, holders arranged to turn upon the spindle, a sheet of flexible material secured to each holder and depending in the path of the shoes, and a spring joining each holder to the spindle.

9. The combination with a frame, of a belt-conveyer arranged to travel therein, opposite arms variable in position upon the frame, a spindle extending between the arms, means arranged to fix the arms in different positions angularly and longitudinally of the belt, and a flexible contact member arranged to oscillate about the spindle and depending therefrom into the path of the shoes on the belt.

10. The combination with an endless conveyer upon which shoes are placed bottom down, of opposite brackets, a member pivoted upon the brackets, said member being situated opposite the delivery end of the conveyer and inclined downwardly and toward the opposite extremity of said conveyer and arranged for contact with the forward side of the shoes as they leave the conveyer to direct them and maintain them substantially bottom down, and means arranged to vary the position of the brackets longitudinally of the conveyer.

11. The combination with an endless conveyer upon which shoes are placed bottom down, of opposite brackets, a member pivoted upon the brackets, said member being situated opposite the delivery end of the conveyer and inclined downwardly and toward the opposite extremity of said conveyer and arranged for contact with the forward side of the shoes as they leave the conveyer to direct them and maintain them substantially bottom down, means arranged to vary the position of the brackets longitudinally of the conveyer, and means arranged to vary the normal inclination of the member upon the brackets.

12. The combination with a conveyer upon which shoes on lasts are placed bottom down, of a member situated at the delivery end of the conveyer and arranged to co-operate with the cone of each last to hold it against tilting forward as the shoe passes over the end of the conveyer, and a member opposite the delivery end of the conveyer and inclined downwardly and toward the opposite extremity of the said conveyer and arranged to contact with the forward side of the shoes to direct them and maintain their position bottom down.

13. In a shoe-conveying system, a shoe-conveyer, a movable positioning member situated below the delivery end of the conveyer and arranged for contact with the shoes during their fall therefrom and after the completion of said fall, and means for returning the displaced member to its normal position.

14. In a shoe-conveying system, an upper shoe-conveyer, a lower shoe-conveyer, a movable member situated below the delivery end of the upper conveyer for displacement by shoes falling therefrom, and means for returning the displaced member to its normal position, said member during its return moving in contact with the shoe to position it upon the lower conveyer.

15. In a shoe-conveying system, an upper shoe-conveyer, a lower shoe-conveyer, a movable member situated below the delivery end of the upper conveyer for displacement by shoes falling upon the lower conveyer, and means arranged to return the displaced member to its normal position, the member during such return acting upon the shoe on the lower conveyer to tip it thereon.

16. In a shoe-conveying system, an upper shoe-conveyer, an oppositely movable conveyer to which the upper conveyer delivers, means for driving the conveyers, and a yieldable member extending substantially horizontally between the conveyers at the delivery end of the upper and arranged for displacement by falling shoes to tip them oppositely to the direction of travel.

17. In a shoe-conveying system, an upper shoe-conveyer, a lower conveyer to which the upper conveyer delivers, means for moving the conveyers in opposite directions, a deflector extending across the delivery end of the upper conveyer and being inclined inwardly and downwardly toward the lower conveyer, a pivoted contact member extending from beneath the upper conveyer toward the deflector, and means arranged to hold the contact member normally in the path of shoes falling from the upper conveyer.

18. In a shoe-conveying system, an upper shoe-conveyer, a lower conveyer to which the upper conveyer delivers, means for moving the conveyers in opposite directions, a deflector extending across the delivery end of the upper conveyer and being inclined inwardly and downwardly toward the lower conveyer, a pivoted contact member extending from beneath the upper conveyer toward the deflector, and means arranged to return the member to its normal position after displacement by a falling shoe, said member in its return contacting with said shoe to position it.

19. In a shoe-conveying system, a shoe-conveyer, driving means therefor, means for controlling the driving means, a movable shoe-positioning member situated below the delivery end of the conveyer for displacement by shoes falling therefrom, means for returning the displaced member to its normal position, and connections between the member and controlling means, said connections being effective to actuate said controlling means after a predetermined movement of the member.

20. In a shoe-conveying system, a shoe-conveyer, driving means for the conveyer, means including a movable controlling device for connecting and disconnecting the driving means from the conveyer, a plurality of members movable by the shoes in their delivery from the conveyer, and connections between the members and the controlling device.

21. In a shoe-conveying system, an upper shoe-conveyer, a lower conveyer to which the upper delivers, driving means for the conveyers, means including a movable controlling device for connecting and disconnecting the driving means from the conveyers, a plurality of members movable by the shoes in their passage between the conveyers, and connections between the members and the controlling device and arranged to act thereon independently of one another.

22. In a shoe-conveying system, an upper shoe-conveyer, a lower conveyer to which the upper delivers, driving means for the conveyers, means including a movable controlling device for connecting and disconnecting the driving means from the conveyers, a pivotal mounting for the controlling device, a plurality of members movable by the shoes in their passage between the conveyers, independent contact members movable into engagement with the pivotal mounting, and connections from each shoe-actuated member to a contact member.

23. In a shoe-conveying system, an upper shoe-conveyer, a lower conveyer to which the upper delivers, driving means for the conveyers, means including an electric switch for connecting and disconnecting the driving means from the conveyers, a pivotal mounting for the switch, a plurality of levers arranged for contact therewith, a plurality of members movable by the shoes in their passage between the conveyers, and independent connections between each member and a lever.

AUGUST R. SCHOENKY.